E. T. COUSE,
TRANSMISSION MECHANISM.
APPLICATION FILED FEB. 3, 1919.

1,317,075.

Patented Sept. 23, 1919.

INVENTOR
Elvin T. Couse
BY John A. Naismith
HIS ATTORNEY

E. T. COUSE.
TRANSMISSION MECHANISM.
APPLICATION FILED FEB. 3, 1919.

1,317,075.

Patented Sept. 23, 1919.
3 SHEETS—SHEET 3.

INVENTOR
Elvin T. Couse
BY John A. Naismith
HIS ATTORNEY

UNITED STATES PATENT OFFICE.

ELVIN T. COUSE, OF SAN JOSE, CALIFORNIA.

TRANSMISSION MECHANISM.

1,317,075.        Specification of Letters Patent.    Patented Sept. 23, 1919.

Application filed February 3, 1919. Serial No. 274,661.

*To all whom it may concern:*

Be it known that I, ELVIN T. COUSE, a citizen of the United States, and resident of San Jose, in the county of Santa Clara and State of California, have invented certain new and useful Improvements in Transmission Mechanisms, of which the following is a specification.

My invention relates particularly to the transmission mechanism of a track-laying tractor, and more particularly to that portion of the transmission mechanism including the drive shaft and differential gearing.

In those types of motor vehicles in which a differential gearing is inserted midway of the length of the drive shaft the said drive shaft is made in two parts connected at their inner ends by the said differential gearing. This construction is faulty because the central portion of the shaft where the greatest strain comes is the weakest point throughout its length. With such a construction it is not feasible to superimpose heavy weights on the shaft, or to build up a heavy duty mechanism because the additional weight of the material used in the construction tends to deflect the shaft members and bind the gearing and subject the various parts of the mechanism to stresses and strains which they are not built to withstand.

It is the object of my invention to provide a mechanism whereby a continuous supporting shaft may be used in conjunction with the differential and drive shafts, thereby permitting the use of a central support for the shaft and consequently eliminating the troubles and limitations above referred to. Another object is to provide a mechanism whereby the differential is under the direct control of the operator so that the speed of the driven member on each side of the differential may be slowed down at will, thereby rendering the machine capable of being steered and consequently providing a machine of increased flexibility. I also contemplate providing certain means for adjusting the several parts distributed along the drive shaft so that they will at all times bear the proper relation to the differential.

With these and other objects in view, my invention consists in the novel and useful provision, formation, construction, combination and relative association of parts, members and features all as hereinafter described, shown in the drawings and finally pointed out in the claims.

In the drawings.

Similar characters of reference indicate similar parts throughout the several views.

Since the two sides of the device are the same in construction and arrangement, one side only is described the corresponding parts on the opposite side being indicated by a similar numeral with an appropriate letter attached.

Figure 1:
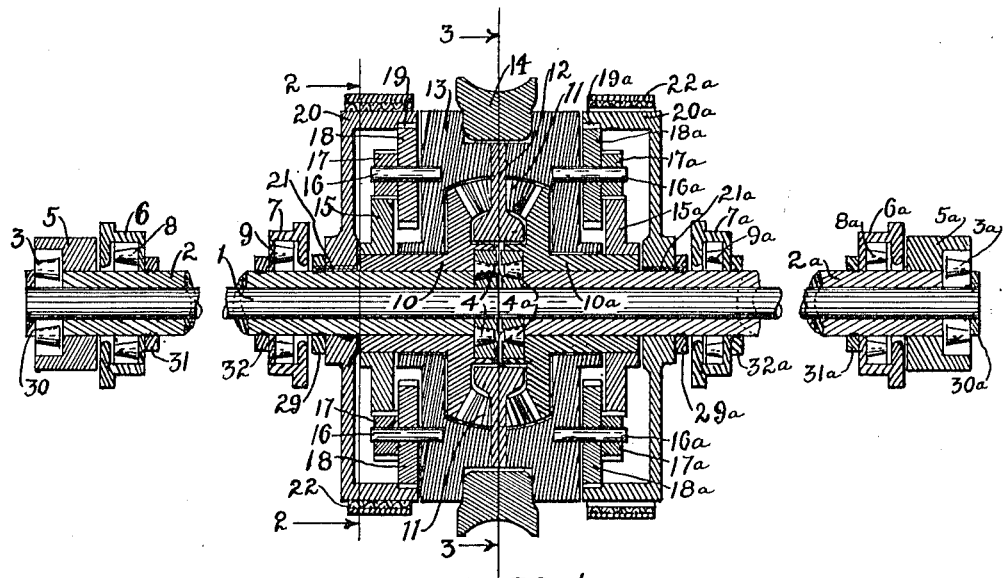
Figure 1 is a vertical and longitudinal section through a device embodying my improvements, mounted upon a continuous shaft, parts being broken away.
Figure 2:
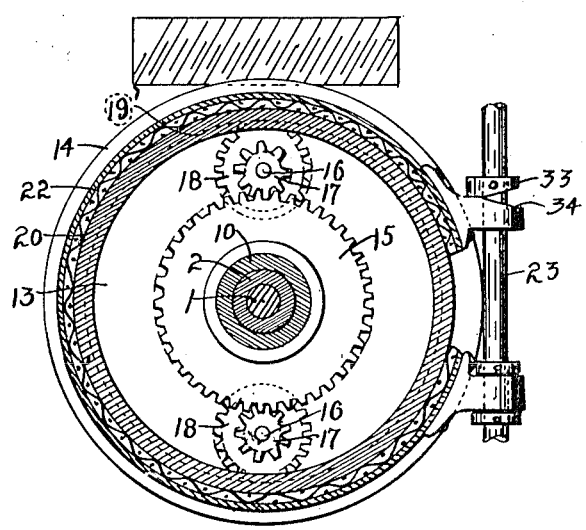
Fig. 2 is a sectional view on line 2—2 of Fig. 1.

Referring now more particularly to the drawing, 1 indicates the supporting shaft carrying hollow drive shaft 2 and bearings 3 and 4. The hollow drive shaft 2 rotates freely on shaft 1 and on bearings 3 and 4 through the medium of the several gears hereinafter described, the terminal driving gear 5 operating on bearing 3.

At 6 and 7 are indicated stationary collars for carrying the usual housing and parts of the superstructure of the machine not shown, the shaft 2 operating freely therein through the medium of bearings 8 and 9.

At 10 is shown an opposing bevel gear keyed to the shaft 2 and supported on shaft 1 by bearing 4. Gear 10 is permanently in mesh with pinions 11, the pinions 11 being mounted in spider 12, and spider 12 in turn being fixedly mounted in differential case 13 which latter carries the main drive gear 14. Spur gear 15 is fixedly mounted on the hub of gear 10 as shown. Normally members 15—14—13—12—11—10—5 and 2 revolve freely about shaft 1 on bearings 3 and 4, the relative speeds of the two sides varying only for the purpose of compensation in the usual manner.

A positive control of the relative speeds of the two sides is however provided in the following described mechanism. In each side of differential case 13 is fixed a pin 16, pin 16 carrying a pair of gears as 17 and 18 operating as a unit about pin 16, gear 18 being larger than gear 17 and meshing with an internal gear 19 in planetary drum 20, and gear 17 meshing with gear 15. The planetary drum 20 is provided with a bearing 21 and may revolve with shaft 2 or about shaft 2 on bearing 21. At 22 is shown a brake-band mounted on drum 20 and operated by means of rod 23 carrying gear 24 which meshes with a gear 25. Gear 25 is provided with a shaft 26 mounted in bearings 27 and provided with a hand-wheel 28.

Planetary drum 20 may be held in proper position on shaft 2 by means of adjusting collar 29. Adjusting collars 30 and 31 and 32 are also provided for taking up any play that may develop in the several bearings, each collar being threaded on to the member upon which it is placed.

From the above description it may be seen that normally all of the members from 10 to 20 inclusive and members 2 and 5 on both sides of the central bearings 4 and 4$^a$ revolve at a substantially uniform rate of speed. If, however, the handle 28 is turned in the direction indicated by the arrow the brake-band is caused to close down on drum 20 through the medium of the parts mentioned and cam 33 operating upon cam surface 34 thereby materially reducing its speed of rotation, the brake-band on drum 20$^a$ at the same time being loosened. As members 2 and 10 to 18 inclusive continue to rotate about shaft 1 at the same speed the gears 18 and 17 are caused to rotate upon pin 16 in the opposite direction to the movement of drum 20. But since gear 17 meshes with gear 15 the said gear 15 is caused to revolve in the same direction as drum 20 at a rate of speed determined by the proportionate sizes of the said gears. The effect of this is that members 2 and 10 and the driving gear 5 are caused to move more rapidly than members 2$^a$ and 10$^a$ and driving gear 5$^a$ and the machine is caused to turn in that direction, either sharply if drum 20 is held immovable or gradually if drum 20 is allowed to rotate slowly.

One important feature of this arrangement is that but little power is lost during the turning movement. The power continues to be applied to case 13 in the usual manner and the speed of rotation of member 13 is not changed, therefore the power is transmitted as positively to one gear 5 as to the other gear 5$^a$, their speed of rotation only varying.

The construction of this mechanism is such that it can be built up in any desired proportions. That is, if the gear mechanism is built up for heavy work the shaft 1 may be made proportionally heavier so that a uniformly strong and durable mechanism is secured, and may be fixedly or rotatably mounted as desired.

Figure 6:
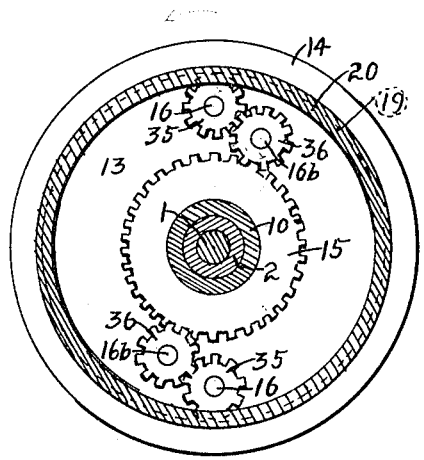
Fig. 6 is a sectional view on line 6—6 of Fig. 5.
Figure 5:
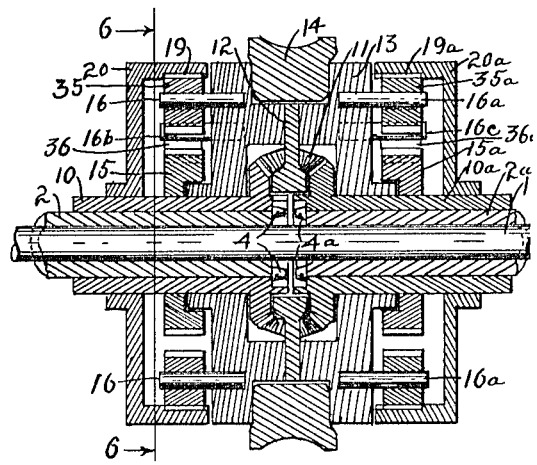
Fig. 5 is a sectional view of a portion of another embodiment of my invention.
Figure 3:
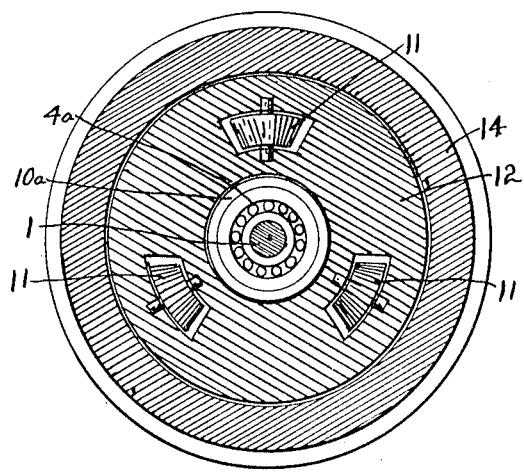
Fig. 3 is a sectional view on line 3—3 of Fig. 1.
Figure 4:
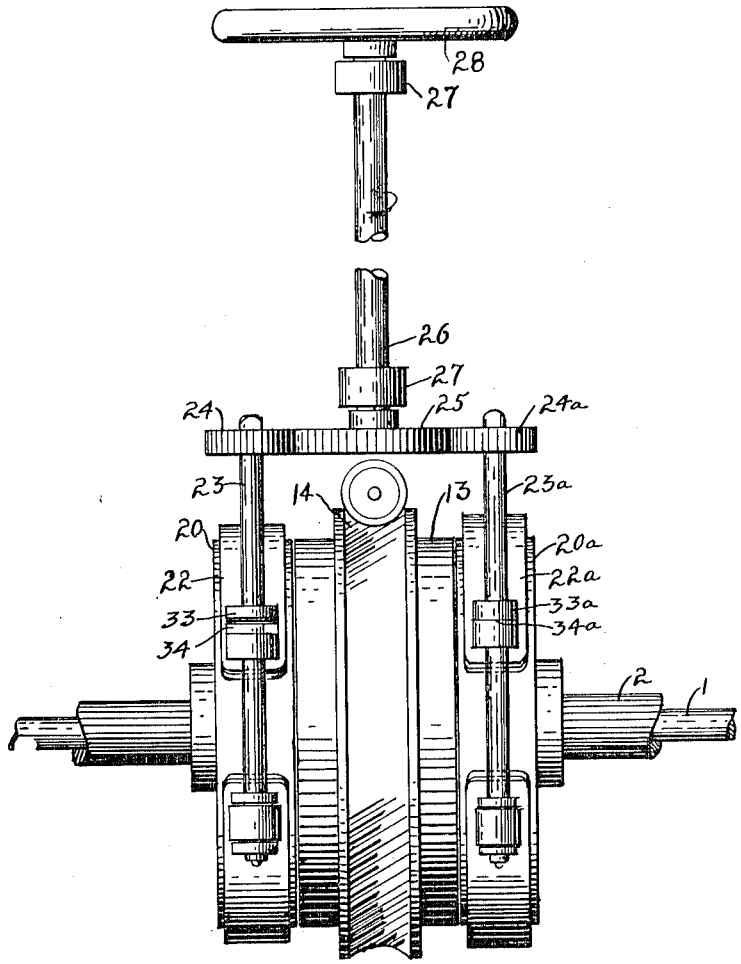
Fig. 4 is a front elevation of the incased differential with governing device mounted thereon.

In Figs. 5 and 6 is illustrated a method of back-gearing that may also be used with the construction described and consisting of a pair of meshing gears 35 on pin 16 and 36 on pin 16$^b$, the former meshing with gear 19 in drum 20, and the latter with gear 15. In this construction substantially the same results may be secured as set forth in connection with the construction heretofore described, but the direction of rotation of the driven shafts is reversed when the brake-band is applied.

It is clear of course that the continuous shaft 1 may be used with the differential mechanism and without the controlling mechanism, but the controlling mechanism would ordinarily be used in conjunction therewith.

It is understood of course that while I have herein shown and described specific forms of my invention, changes in form, construction, proportions and operation may be made within the scope of the appended claims.

I claim:

1. A transmission mechanism including a pair of opposed differentially connected driving shafts, a bearing shaft operatively mounted therein and passing therethrough, and manually controlled power driven gear connections to each of said driving shafts.

2. A transmission mechanism including a pair of opposed differentially connected driving shafts, a driving member operatively connected thereto, a bearing shaft operatively mounted therein, and manually controlled gear connections between said driving member and said driving shafts.

3. In a transmission mechanism, a bearing shaft, a pair of driving shafts operatively mounted thereon, a differential gearing operatively connecting the inner ends of said driving shafts, a driving member operatively connected to said differential gearing, and speed controlling gearings operatively connecting said driving member and said driving shafts.

4. In a transmission mechanism, a bearing shaft, a pair of driving shafts operatively mounted thereon, a differential gearing operatively connecting the inner ends of said driving shafts, a driving member operatively connected to said differential gearing, speed controlling gearings operatively connecting said driving member and said driving shafts, and means for controlling said speed controlling gearings.

5. In a transmission mechanism, a bearing shaft, a pair of driving shafts operatively mounted thereon, a differential gearing operatively connecting the inner ends of said driving shafts, a driving member operatively connected to said differential gearing, speed controlling gearings operatively connecting said driving member with said driving shafts, and means for simultaneously rendering one of said speed controlling gearings operative and the other inoperative.

6. In a transmission mechanism, a bearing shaft, a pair of driving shafts operatively mounted thereon, a differential gearing operatively connecting the inner ends of said driving shafts, a driving member operatively connected to said differential gearing, speed controlling gearings operatively connecting said driving member with said driving shafts, and means for simultaneously rendering one of said speed controlling gearings operative and the other inoperative, or simultaneously rendering both of said speed controlling gearings inoperative.

7. In a transmission mechanism, a bearing shaft, a pair of driving shafts operatively mounted thereon, a differential gearing operatively connecting the inner ends of said driving shafts, a driving member operatively connected to said differential gearing, speed controlling gearings operatively connecting said driving member and said driving shafts, and means for controlling said speed controlling gearings without destroying the driving connections between said driving member and said driving shafts.

8. In a transmission mechanism, a bearing shaft, a pair of driving shafts operatively mounted thereon, a differential gearing operatively connecting the inner ends of said driving shafts, a driving member operatively connected to said differential gearing, speed controlling gearings operatively connecting said driving member with each of said driving shafts, and means for rendering each of said speed controlling gearings inoperative without destroying the driving connection between said driving member and said driving shafts.

9. In a transmission mechanism, a bearing shaft, a pair of driving shafts operatively mounted thereon, a differential gearing operatively connecting the inner ends of said driving shafts, a driving member operatively connected to said differential gearing, and speed controlling gearings operatively connecting said driving member and said driving shafts, each of said speed controlling gearings comprising a gear mounted to rotate with its respective differential gear, an internally geared member mounted to rotate about the axis of said shaft, and a pair of gears of unequal size mounted to rotate as a unit about an axis fixedly positioned with relation to said driving member, the larger of said gears having permanent engagement with said internal gear and the smaller of said gears having permanent engagement with said first mentioned gear, and means for controlling said internally geared member whereby said speed controlling gearing may be rendered operative.

In testimony whereof I have hereunto affixed my signature this 24th day of January, 1919.

ELVIN T. COUSE.